(12) United States Patent
Cao (10) Patent No.: US 10,485,071 B2
(45) Date of Patent: Nov. 19, 2019

(54) ANIMALS-AND-PLANTS-FARMING LIGHT CONTROL SYSTEM

(71) Applicant: Panasonic Intellectual Property Management Co., Ltd., Osaka (JP)

(72) Inventor: Bo Cao, Beijing (CN)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/047,962

(22) Filed: Jul. 27, 2018

(65) Prior Publication Data
US 2019/0037665 A1    Jan. 31, 2019

(30) Foreign Application Priority Data
Jul. 28, 2017    (CN) .................... 2017 2 0939361 U (51) Int. Cl.
| | |
|---|---|
| *H05B 37/02* | (2006.01) |
| *H05B 33/08* | (2006.01) |
| *A01K 45/00* | (2006.01) |
| *A01K 31/18* | (2006.01) |
| *A01G 7/04* | (2006.01) |
| *G06F 3/0484* | (2013.01) |
| *G06F 3/0488* | (2013.01) |

(52) U.S. Cl.
CPC ......... *H05B 33/0863* (2013.01); *A01G 7/045* (2013.01); *A01K 31/18* (2013.01); *A01K 45/00* (2013.01); *H05B 37/0272* (2013.01); *G06F 3/0484* (2013.01); *G06F 3/0488* (2013.01)

(58) Field of Classification Search
CPC ............................... H05B 33/0863; H05B 37/0245; A01K 45/00; A01K 31/18; A01G 7/045
USPC ........................................... 315/130
See application file for complete search history.

(56) References Cited

U.S. PATENT DOCUMENTS

| | | | |
|---|---|---|---|
| 2011/0175553 A1* | 7/2011 | Sampsell | H05B 37/0245 315/312 |
| 2016/0000046 A1* | 1/2016 | Li | A01K 31/002 362/1 |
| 2016/0178179 A1* | 6/2016 | Hanson | A01G 2/00 362/249.02 |
| 2018/0116025 A1* | 4/2018 | Adams | H05B 37/0281 |
| 2018/0220506 A1* | 8/2018 | Sadwick | F21S 2/00 |

* cited by examiner

*Primary Examiner* — Daniel D Chang
(74) *Attorney, Agent, or Firm* — McDermott Will & Emery LLP (57) ABSTRACT

A farming light control system includes: one or more rows of lighting devices provided in a sealed farming environment; and an interface module. One or more lighting devices in each of the one or more rows of lighting devices connect to a first end of the interface module via a communication line. Each of the one or more rows of lighting devices includes the one or more lighting devices. Each of the one or more lighting devices includes a green light emitting diode (LED), a blue LED, and a white LED. A second end of the interface module connects to a control module. The control module connects to the one or more rows of lighting devices via the interface module. Each of the lighting devices has different-color LED particles. The light emission states of the lighting devices are automatically controlled by the control module.

12 Claims, 4 Drawing Sheets

ANIMALS-AND-PLANTS-FARMING LIGHT CONTROL SYSTEM

CROSS REFERENCE TO RELATED APPLICATION

The present application claims the benefit of Chinese Patent Application No. 2017209393611 filed Jul. 28, 2017. The entire disclosure of the above-identified application, including the specification, drawings and claims is incorporated herein by reference in its entirety.

FIELD

The present disclosure relates to the technical field of farming, and particularly to a farming light control system.

BACKGROUND

Light irradiation is one of important environmental conditions in the process of growth of poultry. Light rays having different color temperatures cause extremely important effects on the growth of the poultry. Thus, there have been increasing user needs on light irradiation control in farming environments. Accordingly, there have been increasing needs on each of farming lighting devices, farming light control systems, and farming light control methods.

SUMMARY

Technical Problem

Current light control systems in farming places are a timer switch or a 0-10 V dimming control system. Thus, automatic light control and large-scale commercial use are not enabled.

In view of this, the present disclosure provides a farming light control system and a farming light control method which enable automatic light control and large-scale commercial use.

Solution to Problem

In order to solve the above-described technical problem, according to an embodiment of the present disclosure, a farming light control system is provided. The farming light control system includes: one or more rows of lighting devices each connected to a control device, wherein each of the one or more rows of lighting devices includes one or more of the lighting devices, and each of the lighting devices includes a plurality of light emitting diodes (LEDs), the control device includes: a wireless communication module which uploads data to a cloud server, or receives a first control instruction which is transmitted by the cloud server; a control module which connects to the wireless communication module, transmits a control signal to each of the lighting devices based on the first control instruction, and controls a light emission state of the lighting device; and an electronic device which transmits the first control instruction to the control device via the cloud server based on a user operation.

In a method that can be implemented, in the farming light control system, the control device further includes an interface module, and the interface module has a first end connected to the control module and a second end connected to the one or more rows of lighting devices.

In a method that can be implemented, the control module is a programmable logic controller, and the interface module is an RS485 interface.

In a method that can be implemented, the lighting devices include a green LED, a blue LED, and a white LED.

In a method that can be implemented, the control device further includes a touch panel, the touch panel connects to the control module, and transmits a second control signal to the control module based on a user operation, and the control module transmits a control signal to each of the one or more of the lighting devices based on the second control instruction, and controls a light emission state of the lighting device.

In a method that can be implemented, the control device further includes a connection line terminal, and the connection line terminal has a first end connected to a second end of the RS485 interface and a second end connected to the one or more rows of lighting devices via an RS485 communication line.

In a method that can be implemented, the control device further includes an alert module which connects to the control module and issues an alert based on an alert signal which is transmitted by the control module.

In a method that can be implemented, the touch panel displays position information of a lighting device having a trouble included in the one or more rows of lighting devices, based on an alert signal which is transmitted by the control module.

In a method that can be implemented, the touch panel includes a mode switch button, the mode switch button transmits a mode switch instruction to the control module based on a user operation, and the control module causes each of the one or more lighting devices to switch between a first mode and a second mode, based on the mode switch instruction.

In a method that can be implemented, the first mode is a farming mode, and the second mode is a cleaning mode.

In a method that can be implemented, the system further includes: one or more elements selected from among an illuminometer, a spectrometer, a temperature sensor, and a humidity sensor; the one or more elements being provided in a sealed farming environment, collecting information indicating at least one of a luminance, a spectrum, a temperature, and a humidity in the sealed farming environment, and transmitting the information to the control device.

Advantageous Effects

The farming light control system causes a wireless communication module thereof to update data to a cloud server, and to receive a first control instruction which is transmitted by the cloud server. With the farming light control system, a user can perform remote control on a farming place using an electronic device (for example, a terminal (that is for example a mobile phone, a tablet PC, or the like), and controls automatic light monitor. Such automatic light control on the farming place helps the user to perform operations easily and quickly. Accordingly, large-scale commercial use of the automatic light control is enabled.

BRIEF DESCRIPTION OF DRAWINGS

Based on details of exemplary embodiments explained with reference to the drawings below, other features and aspects of the present disclosure are clarified.

The drawings are intended to indicate the exemplary embodiments, the features, and the aspects of the present

DESCRIPTION OF EMBODIMENTS

Hereinafter, exemplary embodiments, features, and aspects are described in detail with reference to the drawings.

In the drawings, the same reference signs denote the same or similar functional elements. Although the respective aspects of the embodiments are illustrated in the drawings, there is no need to illustrate them according to the reduced scales unless otherwise specified.

Here, the term "exemplary" indicates "an example, an embodiment, or use for illustrative purpose". Any of the embodiments explained as an "exemplary" one here should not be interpreted as being preferable to or more advantageous than the other embodiments.

In addition, in order to explain the present disclosure better, a number of specific details are indicated in the specific aspects below. Any person ordinarily skilled in the art should appreciate that the present disclosure can be implemented in the same manner irrespective of these specific details. Methods, means, elements, and circuits which have been well known by any person ordinarily skilled in the art are not explained in detail in some of the embodiments, in order to clarify the scope of the present disclosure.

(Embodiment 1)

Figure 1:
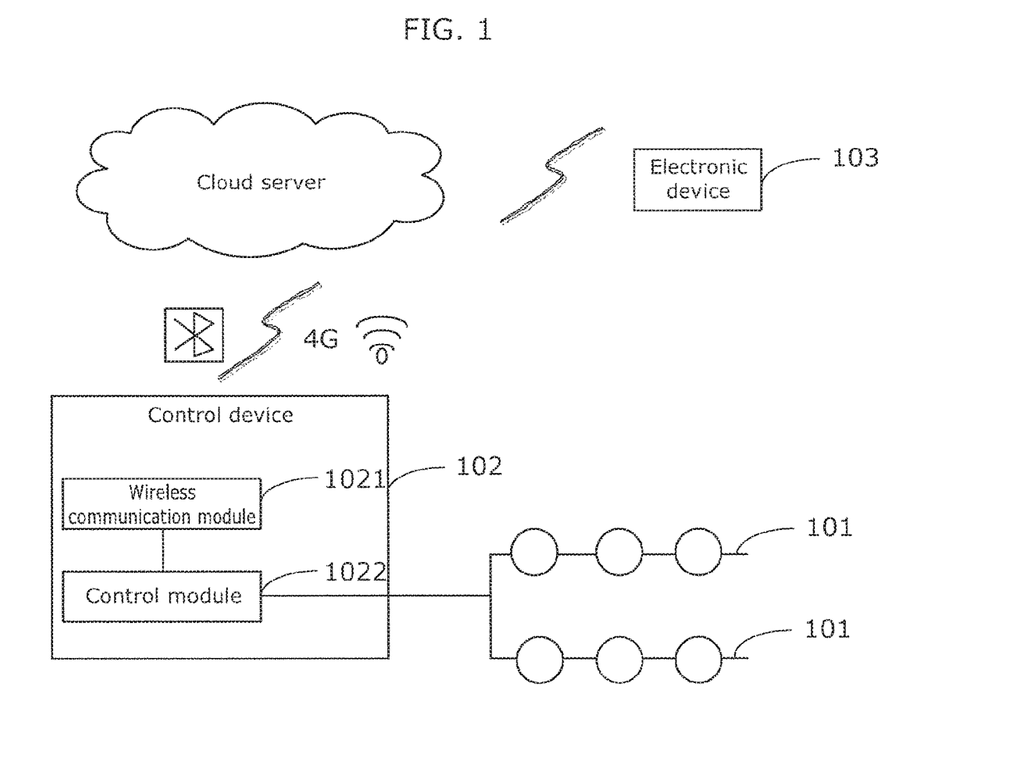
FIG. 1 is a diagram illustrating a farming light control system according to an embodiment of the present disclosure.

FIG. 1 is a diagram indicating a farming light control system according to an aspect of the present disclosure. The farming light control system is applicable to farming places such as poultry-farming places and duck-farming places, and further to indoor plant farming, etc.

As illustrated in FIG. 1, a farming light control system mainly includes one or more rows of lighting devices 101 each connected to a control device 102. Each of the one or more rows of lighting devices 101 specifically includes one or more of the lighting devices. Each of the lighting devices includes a plurality of light emitting diodes (LEDs). The control device 102 includes a wireless communication module 1021. The wireless communication module 1021 uploads data to a cloud server, or receives a first control instruction which is transmitted by the cloud server. A control module 1022 connects to the wireless communication module 1021, transmits a control signal to each of the lighting devices based on the first control instruction, and controls a light emission state of the lighting device. An electronic device 103 transmits the first control instruction to the control device 102 via the cloud server based on a user operation.

The farming light control system causes a wireless communication module thereof to update data to a cloud server, and to receive a first control instruction which is transmitted by the cloud server. With the farming light control system, a user can perform remote control on a farming place using an electronic device (for example, a terminal that is for example a mobile phone, a tablet PC, or the like), and controls automatic light monitor. Such automatic light control on the farming place helps the user to perform operations easily and quickly. Accordingly, large-scale commercial use of the automatic light control is enabled.

For example, the electronic device 103 may be a terminal device that is a mobile phone, a tablet PC, a PC, or the like. A suitable application program is installed in the electronic device 103. After the application program is started, the electronic device 103 displays, on a display interface, operation buttons (for example, Start, Pause, and Stop the farming mode, Start and Stop the cleaning mode, Adjust luminance, etc.). The electronic device 103 may further include mechanical operation buttons. The present disclosure is not limited thereto. A user performs an operation by touching an operation button using a finger, a stylus, or the like. The electronic device 103 transmits a first control signal to the cloud server based on the user operation. An example is given. The user touches the button of Start the farming mode using a finger. The electronic device 103 detects the touch by the user, then, transmits a first control instruction corresponding to Start a farming mode to the cloud server. The cloud server receives the first control instruction, and then transmits the first control instruction to the control device 102. The control device 102 transmits a control signal to each of the lighting devices based on the first control instruction, and controls the light emission state of the lighting device.

The wireless communication module 1021 further uploads data to the cloud server. The data includes the light emission states of the lighting devices, a trouble alert signal of a lighting device having a trouble, a specific location of the lighting device having the trouble. The present disclosure is not limited to the specific examples.

It is to be noted that any operation performed by the control device 102 is implemented by the electronic device 103. Data transmitted by each lighting device and received by the control module 1022 or an operation performed by a user is synchronized with the electronic device 103 by the cloud server.

When each of the one or more rows of lighting devices 11 includes a plurality of lighting devices, a hand-shake RS 485 connection can be employed for each of the lighting devices, or a series connection method can be employed. This is non-limiting examples of the present disclosure. The one or more lighting devices included in each of the one or more rows of lighting devices can be controlled independently of the one or more lighting devices included in each of the other one or more rows of lighting devices. Each of the lighting devices includes a plurality of LEDs. The plurality of LEDs may have the same color, or different colors.

In a method that can be implemented, the system specifically includes one or more rows of lighting devices 101 according to a farming style or the size of a farming space. More specifically, taking white-feather chickens as an example, the system is applicable to a cage-free farming method, and also to a cage farming method.

Figure 2A:
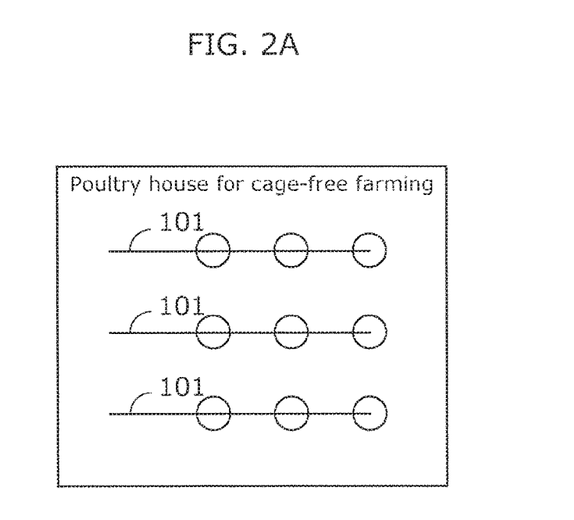
FIG. 2A is a first diagram illustrating an application scene of a farming light control system according to an embodiment of the present disclosure.
Figure 2B:
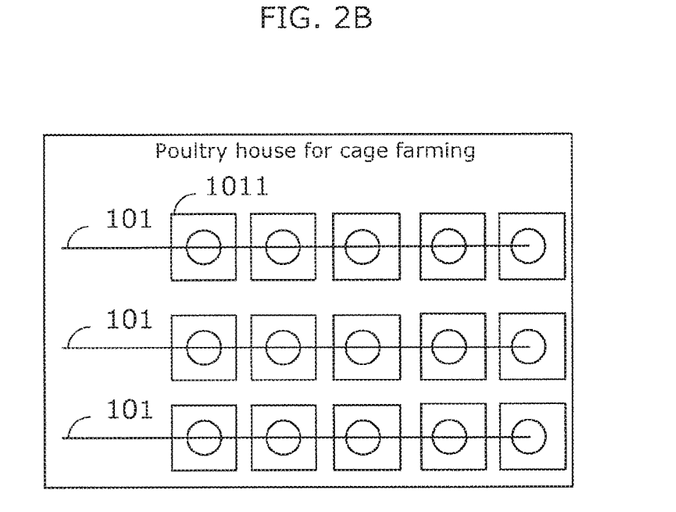
FIG. 2B is a second diagram illustrating an application scene of a farming light control system according to an embodiment of the present disclosure.

FIGS. 2A and 2B are each a diagram illustrating an application scene of a farming light control system according to an embodiment of the present disclosure.

As illustrated in FIG. 2A, when the system is applied to the cage-free farming method, the lighting devices in each row are provided on an upper part of the poultry house, for example, on the roof of the poultry house. One or more rows of lighting devices 11 can be provided in a poultry house for cage-free farming according to the size of the poultry house for cage-free farming. Furthermore, it is possible to set a suitable number of lighting devices included in each row of lighting devices in a poultry house for cage-free farming according to the size of the poultry house for cage-free farming. For example, in the cage-free farming mode, 198 lighting devices are connected to the farming light control system according to the present disclosure. The present disclosure is not limited thereto.

As illustrated in FIG. 2B, when the system is applied to the cage farming method, squares in FIG. 2B indicate bird cages 14, lighting devices are provided on the roofs of the bird cages 14, one or more rows of lighting devices can be provided in each bird cage according to the size of the bird cage, it is possible to set a suitable number of lighting devices included in each row of lighting devices according to the number of bird cages. The present disclosure is not limited thereto.

Figure 3:
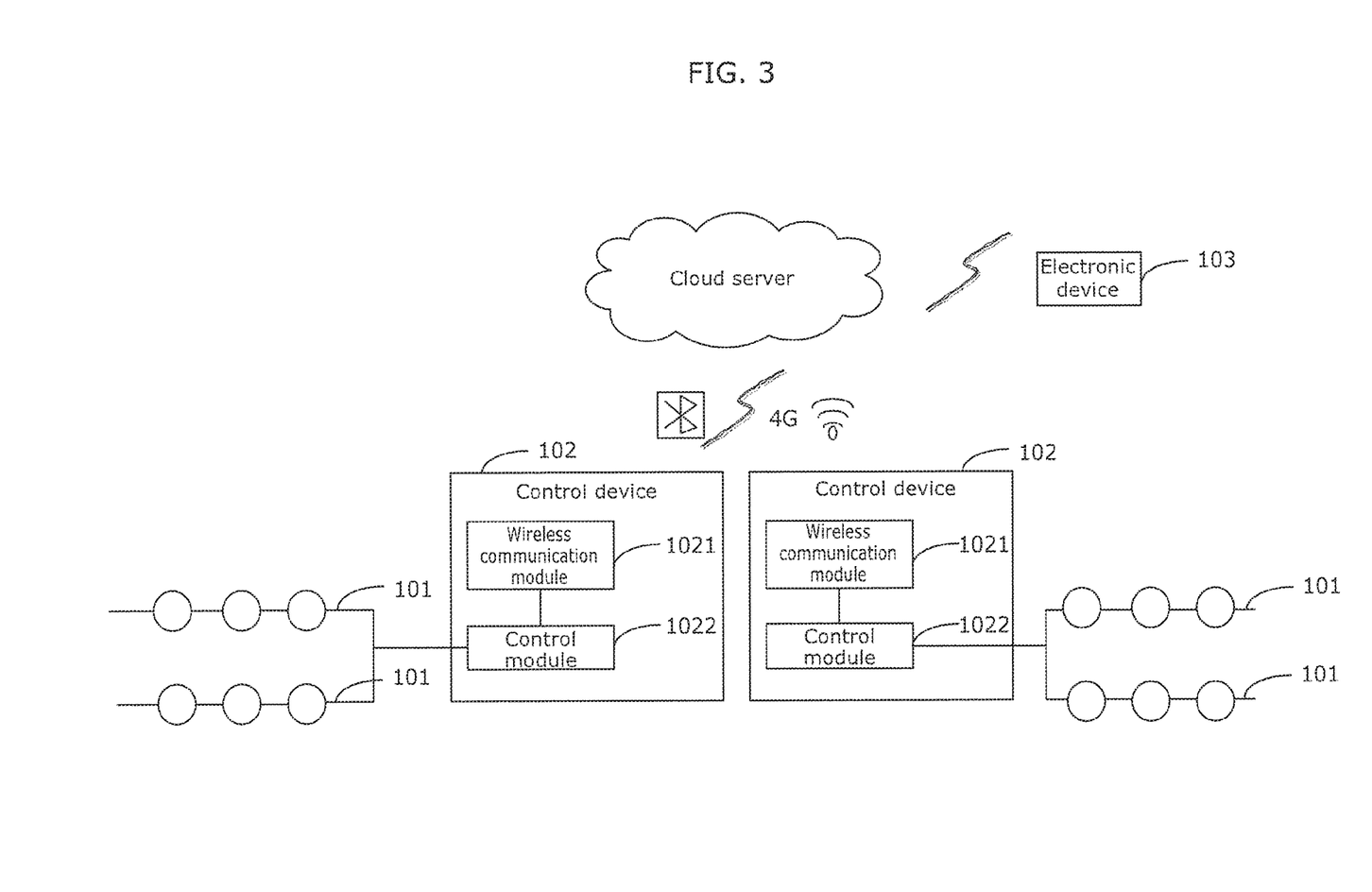
FIG. 3 is a diagram illustrating a farming light control system according to an embodiment of the present disclosure.

FIG. 3 is a diagram illustrating a configuration of a farming light control system according to an embodiment of the present disclosure. As illustrated in FIG. 3, in a method that can be implemented: the system includes a plurality of control devices 102; the respective control devices 102 are located in different farming environments; the first control instruction includes address information of a corresponding one of the control devices 102; and the cloud server receives the first control instruction, then analyzes the first control instruction, obtains address information of the control device 102, and transmits the first control instruction to the control device 102 corresponding to the address information. The wireless communication module 1021 in the control device 102 receives the first control instruction, and then transmits it to the control module 1022. The control module 1022 transmits a control signal to each of the lighting devices based on the stored program, and controls the light emission state of the lighting device.

The farming light control system according to the embodiment allows the same electronic device to control the light emission states of the lighting devices in the plurality of farming environments, which helps the user to perform operations.

In a method that can be implemented: communication between the wireless communication module 1021 and the cloud server can be performed using any of the following techniques: Bluetooth, WiFi, ZigBee, near field communication (NFC, near-distance wireless communication technique), and 4G, that is, the wireless communication module may be a Bluetooth module, a WiFi module, a ZigBee module, a NFC module, or a 4G communication module, or the like; and the control module 1022 is a microprocessor, a programmable logic controller (PLC), or the like. The methods for implementing the wireless communication module and the control module according to the present disclosure are not specifically limited.

Figure 4:
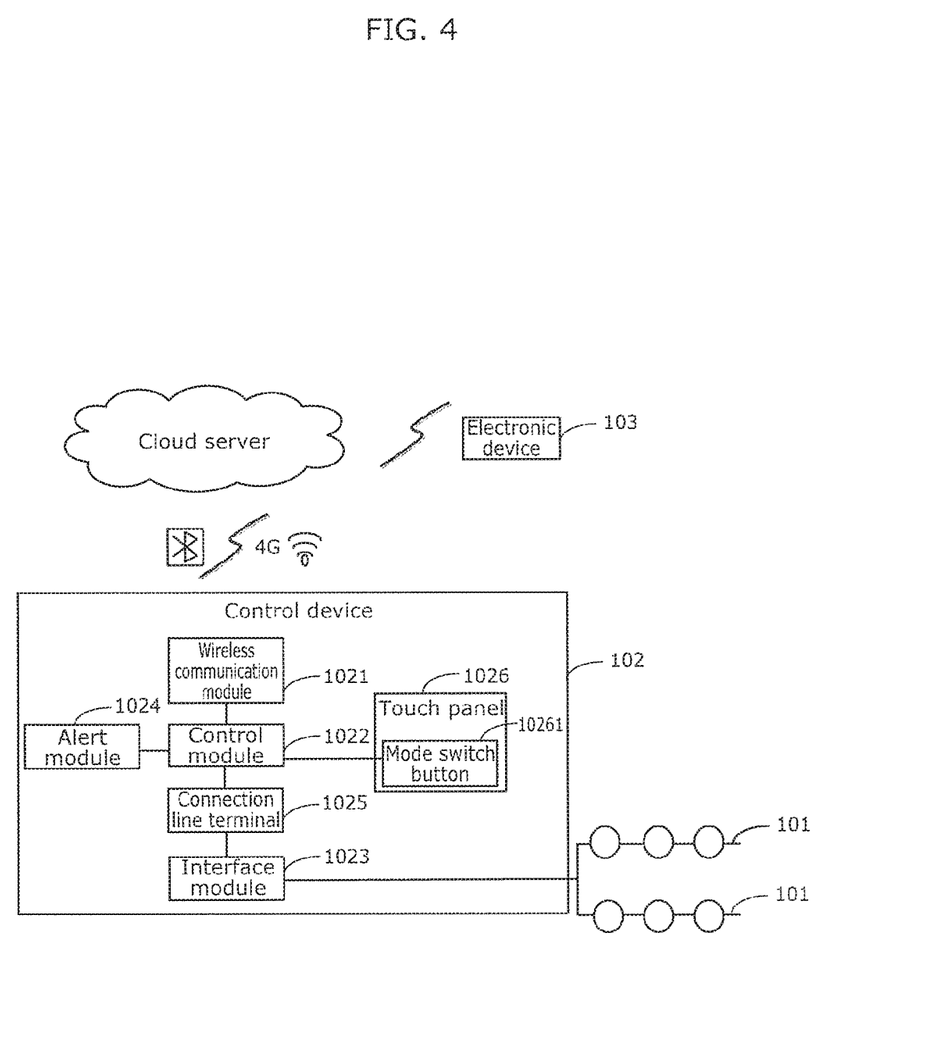
FIG. 4 is a diagram illustrating a farming light control system according to an embodiment of the present disclosure.

FIG. 4 is a diagram illustrating a farming light control system according to an embodiment of the present disclosure. As illustrated in FIG. 4, in a method that can be implemented: the control device 102 further includes an interface module 1023; and the interface module 1023 has a first end connected to the control module 1022, and a second end connected to each of the lighting devices 101.

In a method that can be implemented, the interface module 1023 may be an RS485 interface, or another series communication interface that is for example, an RS422 interface, an RS232 interface, or the like.

An example where the control module 1022 is a PLC is described below. Any person ordinarily skilled in the art edits a corresponding operation instruction based on a farming cycle and stores it in the PLC, activates a program, and then outputs an instruction that is for example, a query instruction, a broad control instruction, or the like, based on the Modbus protocol via the RS485 interface, and refers to or controls the light emission state of each lighting device. The PLC is further capable of receiving a message which is fed back or transmitted by each lighting device, and obtaining position information and the like of the lighting device based on the received message.

An example is given. The control module 1022 is capable of: transmitting an instruction (for example, a query instruction, a control command, or the like) based on the address of each lighting device; referring to the address of the lighting device or controlling the light emission state, etc. of the lighting device; further receiving data transmitted by the lighting device; and executing a corresponding operation based on a device address, a function code, etc. in the data. The operation is, for example, a trouble notification, an alert, or the like. The person ordinarily skilled in the art can define the specific details of the protocol as necessary, and thus the present disclosure is not limited thereto.

It is to be noted that the lighting device includes an RS485 converter circuit corresponding to the RS485 interface, and, after the lighting device receives an instruction transmitted by the control module 1022, causes the RS485 converter circuit to convert the instruction into a serial port command of a microcontroller unit (MCU), thereby controlling lighting devices so that the lighting devices perform corresponding light irradiation based on the serial port command.

At most 9504 lighting devices can be connected to the RS485 interface, in a one-cage farming method, and thus the farming light control system according to the present disclosure is applicable to a large farming environment, and to large-scale commercial use.

In a method that can be implemented, each lighting device can include a green LED, a blue LED, and a white LED. LEDs having different colors can be connected in different circuits, and LEDs having the same color can be connected in the same circuit or in different circuits. For example, all of green LEDs are connected in the same circuit, all of blue LEDs are connected in the same circuit, all of white LEDs are connected in the same circuit. In other words, the green LEDs, the blue LEDs, and the white LEDs are arranged in different circuits. In this way, it is possible to control the LEDs having different colors independently, and thus the light emission states of LEDs each having one of the colors is not affected by LEDs each having any of the other colors.

In this way, the light emission states of the LEDs having different colors can be adjusted according to a request for a spectrum in a farming cycle.

The control module connects to the one or more rows of lighting devices 101 via the interface module 1023. Each of the lighting devices has different-color LED particles. The light emission states of the lighting devices are automatically controlled by the control module. The farming light control system according to the present disclosure enables automatic light control and large-scale commercial use.

As illustrated in FIG. 4, in a method that can be implemented: the control device 102 further includes a connection line terminal 1025; and the connection line terminal 1025 has a first end connected to the second end of the RS485 interface and a second end connected to the one or more rows of lighting devices 101 via the RS485 communication line. The connection line terminal base 1025 is useful in line connection, and particularly when the number of rows of lighting devices to be controlled is comparatively large.

As illustrated in FIG. 4, in a method that can be implemented:
the control device further includes a touch panel 1026; the touch panel 1026 connects to the control module 1022, and transmits a second control instruction to the control module 1022 based on a user operation; and the control module 1022 transmits a control signal to each of the lighting devices based on the second control instruction, and controls the light emission state of the lighting device.

Taking an example, the touch panel 1026 is, for example, a liquid crystal display (LCD) touch panel, an LED touch panel, or the like. The touch panel 1026 displays operation buttons (for example, Start, Pause, and Stop the farming mode, Start and Pause the cleaning mode, and Adjust luminance, etc.). A user performs an operation by touching an operation button using a finger, a stylus, or the like. The touch panel 1026 transmits a second control signal to the control module 1022 based on the user operation. An example is given. The user touches the button of Start the farming mode using a finger. The touch panel 1026 detects the touch by the user, then, transmits a control signal to the control module 1022. The control module 1022 receives the control signal, and then transmits a control instruction to each lighting device via the interface module 1023, based on the stored program, so as to control the light emission state of the lighting device. Any operation performed by the touch panel 1026 may be implemented by the electronic device 103. As illustrated in FIG. 4, in a method that can be implemented: the control device 102 specifically includes an alert module 1024; and the alert module 1024 connects to the control module 1022, and issues an alert based on an alert signal that is transmitted by the control module 1022.

In a method that can be implemented, the alert module 1024 is a device capable of issuing an alert signal which is a sound or light signal, and may be, for example, a buzzer, a speaker, a flash, or the like.

When the lighting device has a trouble (for example, a stroboscopic phenomenon, non-lighting), the lighting device transmits a message (alert signal) to the control module 1022 via the interface module 1023); taking the RS485 interface module as an example, the lighting device transmits a message to the control module 1022 based on the Mod bus protocol; and the message includes position information and trouble information of the lighting device. The control module 1022 is capable of receiving the message transmitted by the lighting device, obtaining the position information and the trouble information based on a device address, a device code, etc. in the message, issuing an alert based on the trouble information, for example, by issuing a buzzer sound so as to alert a farming worker to the trouble.

In this way, when the lighting device has a trouble, the alert is issued to the farming worker so that the farming worker performs a test and a repair as necessary to reduce a farming death rate, thereby reducing an economical loss of the farming worker.

In a method that can be implemented; the control module 1022 further transmits the position information and the trouble information of the lighting device obtained to the electronic device 103 via the cloud server; and the electronic device 103 receives the above information, then issues an alert to the farming worker by issuing a buzzer sound, and then displays the position information, the trouble information, etc. of one or more lighting devices each having a trouble on the display interface.

In a method that can be implemented: the control module 1022 further receives a message that is transmitted by the lighting device and transmits the message to the electronic device 103; the electronic device 103 obtains the position information and the trouble information of the lighting device based on a device address, a device code, etc. in the received message, issues an alert based on the trouble information, and then issues an alert to the farming worker by issuing a buzzer sound, and then displays the position information, the trouble information, etc. of one or more lighting devices having a trouble on the display interface.

In a method that can be implemented: the touch panel 1026 further displays the position information of the lighting device having the trouble, based on the alert signal which is transmitted by the control module 1.

As described above, when the lighting device has the trouble (for example, a stroboscopic phenomenon, non-lighting), the lighting device transmits a message (alert signal) to the control module 1022 via the interface module 1023; and the message includes the position information and the trouble information of the lighting device. The control module 1022 receives the message transmitted by the lighting device, obtains the position information and the trouble information of the lighting device, based on the device address and the device code in the message, transmits the display control signal to the touch panel 15, and causes the touch panel 1026 to display the position information, the trouble information, etc. of the lighting device having the trouble.

As illustrated in FIG. 4, in a method that can be implemented: the touch panel 1026 further includes a mode switch button 10261 for transmitting a mode switch instruction to the control module 1022, based on a user operation; and the control module 1022 causes the lighting device to switch between a first mode and a second mode based on the mode switch instruction.

Here, the first mode is the farming mode, and the second mode is the cleaning mode. Although the farming mode is a broiler farming mode, the farming mode may be a farming mode for farming other birds, plants, etc., and the present disclosure is not limited thereto.

Taking an example where each of the lighting devices includes a green LED, a blue LED, and a white LED: the green LED and/or the blue LED emit(s) light in a first mode, and the white LED does not emit light; and the white LED emits light and the green LED and the blue LED do not emit light in a second mode. In other words, the green LED and/or the blue LED emit light and the white LED does not emit light in the farming mode, and the white LED emits light and the green LED and the blue LED do not emit light in the cleaning mode.

An example is given. The user touches switch the mode button 10261 using a finger, and the touch panel 1026 detects a user touch, and then a mode switch signal is transmitted to the control module 1022. The control module 1022 receives the mode switch signal, and then a control instruction is transmitted to each lighting device via the interface module 1023, based on the mode switch signal, and a switch to a corresponding mode is made by controlling the lighting device. For example, at an intermediate interval between two neighbouring farming cycles or in a process of a farming cycle, a poultry house needs to be disinfected or cleaned hygienically. Light irradiation for continuously using a farming mode is not suitable as a light irradiation mode at this time. A user touches the button 10261 for starting the cleaning mode. The touch panel 1026 transmits a mode switch signal to the control module 1023. The control module 1022 transmits a control instruction to the lighting device, and switches a current lighting mode to the cleaning mode. In the cleaning mode, the white LEDs emit light, and the green LEDs and the blue LEDs do not emit light. At this time, white light irradiation in general lighting is used in a farming environment, and the light irradiation conditions are suitable for cleaning performed by a farming worker in the poultry house.

In this way, it is possible to provide different needs for light irradiation in different operation modes by adjusting the different operation modes of the lighting devices, and to provide user experience.

In a method that can be implemented: the system further includes one or more elements selected from among an illuminometer, a spectrometer, a temperature sensor, and a humidity sensor. The one or more elements are provided in the sealed farming environment, collect information indicating at least one of a luminance, a spectrum, a temperature, and a humidity in the sealed farming environment, and transmit the information collected, to the control device 102.

Taking the one or more illuminometers as an example, the one or more illuminometers are provided in a sealed farming environment. For example, each of the one or more illuminometers is provided at a position closer to the floor of a poultry house for cage-free farming, or in a bird cage 14 in a poultry house for cage farming, and useful for adjusting the collected illuminance information to illuminance which is suitable for the poultry. In the farming process, each of the one or more illuminometers collects the illuminance in the bird cage 14, and transmits a message to the control module 1022 via a communication line and the interface module 1023. The control module 1023 obtains the illuminance detected by the illuminometer based on the received message, compares the detected illuminance with an illuminance that is currently required in the farming cycle. When the difference between the both exceeds a certain limit value, the control module 1022 transmits a luminance adjustment instruction to the lighting device to adjust the luminance of light to be emitted by the lighting device. At the time of device debugging, the control module 1022 adjusts a control instruction of a program based on the result of the detection fed back by the illuminometer, and it is ensured that an actual illuminance satisfies the requirement for farming. This saves time and cost for manual adjustment, and facilitates the use of the system. For the convenience of reference and comparison, the control module 1022 is capable of recording reference illumination information in each stage of the farming cycle.

When a plurality of illuminometers are provided, the control module 1022 is also capable of adjusting the light emission states of the lighting devices around the illuminometers based on the position information of the illuminometers. For example, the control module 1022 obtains the position information of the illuminometers based on received messages, and transmits a luminance adjustment instruction to the lighting devices positioned around the illuminometers with reference to the media address control (MAC) addresses of the surrounding lighting devices based on the position information so as to control the luminance of light to be emitted by some of the lighting devices.

Likewise, it is also possible to adjust information such as spectra of light emitted by the lighting devices in the farming environment, an ambient temperature, a humidity, or the like, provided by a spectrometer, a temperature sensor, or a humidity sensor. As for specific adjustment methods, the descriptions regarding the illuminometers should be referred to, and the descriptions are not repeated.

The present disclosure encompasses a system, a method, and/or a computer program product. The computer program product includes a computer-readable recording medium. Computer-readable program instructions may be stored thereon for causing a processor to execute each of the aspects of the present disclosure.

The computer-readable recording medium may be a tangible device which stores and records instructions to be used by an instruction executing device. The computer-readable recording medium is not limited thereto, and for example, may be an electric storage device, a magnetic storage device, an optical storage device, an electromagnet storage device, a semiconductor storage device, or an arbitrary combination of these devices. More specific examples (an inexhaustive list) of computer-readable recording media include a portable computer disc, a hard disc, a random access memory (RAM), a read-only memory (ROM), an erasable program read-only memory (EPROM or flash memory), a static random access memory (SRAM), a portable compact disc ROM (CD-ROM), a digital multi-functional disc (DVD), a memory stick, a floppy disc, and a mechanical coding device. For example, the computer-readable recording media may be a card with holes or a structure with protrusions in grooves storing instructions thereon, and an arbitrary combination of the above-described recording media. The computer-readable recording media used here are not interpreted as instantaneous signals themselves (for example, radio waves or other transmissive electromagnetic waves, electromagnetic waves that are transmitted by waves or via other transmission media (for example, optical pulses via an optical fiber cable), or electric signals transmitted via electric wires).

The computer-readable program instructions described here are downloaded to each computer/processor from a computer-readable recording medium, or downloaded to an external computer or an external storage device via one or more networks that are the Internet, a local area network, a broad area network, and/or a wireless internet. The networks include a copper transmission cable, an optical fiber transmission, a wireless transmission, a router, a firewall, an exchanger, a gateway computer and/or an edge server. The network interface card or the network interface in each computer/processor receives computer-readable program instructions from the network, transmits the computer-readable program instructions, and stores them onto the computer-readable recording medium in the computer/processor.

The computer program instructions for executing operations in the present disclosure may be assembler instructions, instruction set architecture (ISA) instructions, device instructions, device-related instructions, micro codes, firmware instructions, state-installation data, or source codes or object codes which are edited by an arbitrary combination of one or more kinds of programming languages. The programming languages include object-oriented programming languages (for example, Smalltalk, C++, etc. and normal procedural programming languages) such as "C" language or similar programming languages. All or part of the computer-readable program instructions may be executed on a user's computer, or may be executed as an independent package. Part of the computer-readable program instructions may be executed on a user's computer, and the other part may be executed on a remote computer. Alternatively, all of the computer-readable program instructions may be executed on a remote computer or a server. In the case related to a remote computer, the remote computer connects to a user computer via an arbitrary kind of network (including a local area network (LAN)) or a broad area network (WAN)), or connects to an external computer (for example, via the Internet using an internet service provider). In an embodiment, an electronic circuit (for example, a programmable logic circuit, a field programmable gate array (FPGA), or a programmable logic array (PLA)) is customized using status information of the computer-readable program instructions so that the electronic circuit can execute the computer-readable program instructions. In this way, each of the aspects of the present disclosure is implemented.

Here, the respective aspects of the present disclosure are explained with reference to the flowcharts of the method and/or block diagrams of the device (system) and the computer program product according to embodiments of the present disclosure. Any combination of the blocks of the flowchart(s) and/or the block diagram(s) and the blocks of the flowchart(s) and/or the block diagram(s) should be appreciated as being executed by computer-readable program instructions.

A device can be generated by supplying these computer-readable program instructions to a general computer, an exclusive computer, or the processor in another programmable data processing device. The device which performs functions/operations defined in the one or more blocks of the flowchart(s) and/or the block diagram(s) is generated by means of these instructions being executed by the computer or the processor in the other programmable data processing device. These computer-readable program instructions are stored in a computer-readable storage medium, and these instructions cause the computer, the programmable data processing device and/or the other device to operate in a particular method. In this way, the computer-readable recording medium storing the instructions includes one product, and it includes instructions for implementing the respective aspects of the functions/operations defined in the one or more blocks of the flowchart(s) and/or the block diagram(s).

The computer-readable program instructions are loaded onto the computer, the other programmable data processing device, or the other device. A series of operation steps is executed on the computer, the other programmable data processing device, or the other device. Processes performed by the computer are generated, thereby causing the functions/operations defined in the one or more blocks of the flowchart(s) and the block(s) to be executed according to the instructions executed on the computer, the other programmable data processing device, or the other device.

The flowchart(s) and block diagram(s) indicate possible architectures, functions, and operations of the system, the method, and the computer program product according to a plurality of embodiments of the present disclosure. In this point: each of the blocks in the flowchart(s) or block diagram(s) indicates a module, a program segment, or part of instructions; and the module, the program segment, or the part of instructions includes instructions that can be executed for implementing one or more predetermined logic functions. In an alternative implementation, functions indicated in some of the blocks in any one of the diagrams may be generated in the order different from the order indicated in the diagram. For example, two consequent blocks may be executed substantially in almost parallel, or may be executed in the opposite order. This is determined by related functions. It is to be noted that any combination of the blocks of the flowchart(s) and/or the block diagram(s) and the blocks of the flowchart(s) and/or the block diagram(s) is executed by an exclusive hardware system for executing the predetermined functions or operations, or executed by a combination of an exclusive hardware and computer instructions.

Although the respective embodiments of the present disclosure have been described above, the descriptions thereof are examples, not inexhaustive, and not limited to the disclosed embodiments. A number of modifications and variations are obvious to any person ordinarily skilled in the art within the scope and sprit of the respective embodiments. The terms used in the text herein are selected to optimally explain technical improvement in actual applications or in the market, or to allow any person ordinarily skilled in the art to appreciate the respective embodiments disclosed in the text.

The invention claimed is:

1. A poultry farming light control system, comprising:
   one or more rows of lighting devices each connected to a control device,
   wherein each of the one or more rows of lighting devices includes one or more of the lighting devices, and
   each of the lighting devices includes a plurality of light emitting diodes (LEDs),
   the control device includes:
   a wireless communication module which uploads data to a cloud server, or receives a first control instruction which is transmitted by the cloud server;
   a control module which connects to the wireless communication module, transmits a control signal to each of the lighting devices based on the first control instruction, and controls a light emission state of the lighting device;
   an electronic device which transmits the first control instruction to the control device via the cloud server based on a user operation;
   the control module being a programmable logic controller;
   an interface module being an RS485 interface; and
   the control module receiving a message fed back by each of the lighting devices via the interface module, and obtaining position information of the lighting device based on the message received.

2. The poultry farming light control system according to claim 1,
   wherein the control device further includes the interface module, and
   the interface module has a first end connected to the control module and a second end connected to the one or more rows of lighting devices.

3. The poultry farming light control system according to claim 2,
   wherein the control device further includes a touch panel,
   the touch panel connects to the control module, and transmits a second control signal to the control module based on a user operation, and
   the control module transmits a control signal to each of the one or more of the lighting devices based on the second control instruction, and controls a light emission state of the lighting device.

4. The poultry farming light control system according to claim 3,
   wherein the touch panel displays position information of a lighting device having a trouble included in the one or more rows of lighting devices, based on an alert signal which is transmitted by the control module.

5. The poultry farming light control system according to claim 3,
wherein the touch panel includes a mode switch button,
the mode switch button transmits a mode switch instruction to the control module based on a user operation, and
the control module causes each of the one or more lighting devices to switch between a first mode and a second mode, based on the mode switch instruction.

6. The poultry farming light control system according to claim 5,
wherein the first mode is a farming mode, and the second mode is a cleaning mode.

7. The poultry farming light control system according to claim 1,
wherein the control device further includes a connection line terminal, and
the connection line terminal has a first end connected to a second end of the RS485 interface and a second end connected to the one or more rows of lighting devices via an RS485 communication line.

8. The poultry farming light control system according to claim 1,
wherein the lighting devices include a green LED, a blue LED, and a white LED.

9. The poultry farming light control system according to claim 1,
wherein the control device further includes an alert module, and
the alert module connects to the control module, and issues an alert based on an alert signal which is transmitted by the control module.

10. The poultry farming light control system according to claim 1, further comprising:
one or more elements selected from among an illuminometer, a spectrometer, a temperature sensor, and a humidity sensor; the one or more elements being provided in a sealed farming environment, collecting information indicating at least one of a luminance, a spectrum, a temperature, and a humidity in the sealed farming environment, and transmitting the information to the control device.

11. The poultry farming light control system according to claim 1,
wherein the control module controls the light emission state of each of the lighting devices by transmitting the control signal based on the Modbus protocol via the interface module.

12. The poultry farming light control system according to claim 1,
wherein each of the lighting devices includes an RS485 converter circuit corresponding to the RS485 interface, and, after the lighting device receives the control signal transmitted by the control module, causes the RS485 converter circuit to convert the control signal into a serial port command of a microcontroller unit (MCU), to control the one or more of the lighting devices including the lighting device based on the serial port command.

* * * * *